(12) United States Patent
Fu et al.

(10) Patent No.: US 6,370,271 B2
(45) Date of Patent: *Apr. 9, 2002

(54) IMAGE PROCESSING APPARATUS AND METHODS FOR PATTERN RECOGNITION

(75) Inventors: Bin Fu, Mountain View; Anoop Bhattacharjya, Sunnyvale, both of CA (US)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/302,680

(22) Filed: Apr. 30, 1999

(51) Int. Cl.[7] ................................................. G06K 9/64
(52) U.S. Cl. .................. 382/217; 358/501; 358/538; 382/135; 382/194; 382/209; 399/366
(58) Field of Search ................................. 382/135, 169, 382/194, 195, 209, 217–219; 358/504, 515, 518, 522; 399/366

(56) References Cited

U.S. PATENT DOCUMENTS

| 4,386,432 A | 5/1983 | Nakamura et al. |
| 4,823,393 A | 4/1989 | Kawakami |
| 5,216,724 A | 6/1993 | Suzuki et al. |
| 5,226,095 A | 7/1993 | Okumura et al. |
| 5,379,093 A | 1/1995 | Hashimoto et al. |
| 5,440,409 A | 8/1995 | Sugano et al. |
| 5,481,378 A | 1/1996 | Sugano et al. |
| 5,483,602 A | 1/1996 | Stenzel et al. |
| 5,515,451 A | 5/1996 | Tsuji et al. |
| 5,533,144 A | 7/1996 | Fan |
| 5,592,573 A | 1/1997 | Eisenbarth et al. |
| 5,604,596 A | 2/1997 | Ukai et al. |
| 5,621,810 A | 4/1997 | Suzuki et al. |
| 5,647,010 A | 7/1997 | Okubo et al. |
| 5,781,653 A | 7/1998 | Okubo |
| 5,793,901 A | 8/1998 | Matsutake et al. |
| 5,845,008 A * | 12/1998 | Katoh et al. ................. 382/217 |

* cited by examiner

Primary Examiner—Jose L. Couso
Assistant Examiner—Gregory Desire
(74) Attorney, Agent, or Firm—Michael T. Gabrik

(57) ABSTRACT

Pattern detection methods, which may be embodied in copiers or scanners/printers, examine documents to be copied or printed to determine whether the documents contain one or more targeted patterns. The pattern detection methods include algorithms that look for certain features and geometric relationships between the features in determining whether one or more of the targeted patterns are present.

15 Claims, 9 Drawing Sheets

IMAGE PROCESSING APPARATUS AND METHODS FOR PATTERN RECOGNITION

CROSS-REFERENCE TO RELATED APPLICATION

This application is related to application Serial No. 09/012,901 entitled "Apparatus and Method For Pattern Recognition," filed Jan. 23, 1998, the contents of which are incorporated herein by reference.

BACKGROUND OF THE INVENTION

1. Field of the Invention

This invention relates generally to pattern detection methods and devices, such as copiers or scanners/printers, on which such methods may be implemented. More particularly, the invention relates to digital copiers and digital scanners/printers with features and capabilities for detecting certain patterns present on documents to be copied/printed. The invention is also applicable to image processing that involves comparing an input image to a stored image, especially for the purposes of authenticating the document containing the image, preventing its replication, or initiating other printer/copier related functions based on the results of the comparison.

2. Description of the Related Art

A number of systems have been proposed for recognizing valuable documents both for verification of authenticity and for prevention of forgery. These generally involve storing an accurate representation of a genuine document, scanning a new document and comparing the scanned document to the stored representation. In vending machines and money changing machines, for example, the desire is to prevent the acceptance of counterfeit currency. Bills submitted into the machines are scanned and compared to one or more acceptable currency patterns. If the scanned pattern matches a pattern of one of the genuine bills with a predetermined degree of similarity then the machine accepts the bill and delivers the change or merchandise. One such currency identification system is set forth in U.S. Pat. No. 4,386,432, issued to Nakamura et al. Typical of such systems, Nakamura conveys the currency note or bill at a fixed speed through a fixed scanning area and detects a characteristic of the bill. In this case it is the presence of a metallic element contained in the printing ink forming the printing pattern on the bill. Such systems typically require that the entire bill be scanned in a predetermined direction and a predetermined orientation. While such requirements may not be an important limitation in vending machines or change machines where the user must insert the bill into a fixed dimension slot in a fixed orientation, such requirements make the identification system inoperative where the scanning orientation is not fixed, e.g., on a copier, where the user can place the bill in a variety of positions on the platen glass.

Alternative systems have been proposed that do not rely as much on a specific orientation of the document on the scanning support surface. Instead these systems attempt to recognize a particular aspect of the document that uniquely identifies it as one that should not be duplicated. U.S. Pat. Nos. 5,440,409 and 5,481,378, issued to Sugano et al., detect a particular color of the background of confidential documents. For example, if documents are not intended to be copied the original document is printed on a red background. The document scanning section of the copier is provided with a color-detecting feature which filters out all but a particular color on the scanned document. It then compares the density of the color signal to a pre-stored color table to determine if it matches the background color of documents that are not to be copied. If a match is found copying is prevented. Such systems have limited application to documents in which a particular color can be chosen as a background color and is not applicable to situations where the particular color may appear on documents that can legitimately be copied. For example, the green on a U.S. bill may appear on any number of documents that can be legitimately copied.

U.S. Pat. Nos. 5,379,093 and 5,515,451 issued to Hashimoto et al. and Tsuji et al., respectively, seek to detect a combination of characteristics of one particular feature of the document to be copied. In the technique set forth in these patents, first a particular color is detected. Then, the image pattern having the particular color is compared to pre-stored standard patterns to detect a certain degree of similarity. Then, the pattern is analyzed to determine if it conforms to a particular shape, i.e. a circle. These systems have particular utility in detecting one unique aspect of a document, i.e. the stamp mark on bank notes issued by the Bank of Japan.

Additional systems have been proposed which seek to address the problem of document orientation on the platen glass. U.S. Pat. No. 5,216,724, issued to Suzuki et al., and U.S. Pat. No. 5,533,144, issued to Fan, are typical of such systems. In Suzuki, for example, the document can be placed in any orientation on the platen. The document is scanned and the scanned images are processed such that the four corners of the document are determined and then the angle of the document on the platen is calculated. Then, one particular feature of the document, e.g., the red stamp mark on a Japanese bank note, is compared to a pre-stored standard pattern which corresponds generally to the calculated angle of the document. A number of standard patterns at various orientation angles are pre-stored. Fan proposes a somewhat different system in which the orientation of the document is first calculated and then the pre-stored patterns or templates are rotated to match the angle of the scanned document. In both of these systems the orientation of the document must first be calculated, which requires the detection of edges and corners.

SUMMARY OF THE INVENTION

It is an object of the present invention to overcome the aforementioned problems and disadvantages of conventional systems for recognizing certain types of documents or patterns thereon.

Another object of this invention is to provide an improved system for detecting certain types of patterns present on documents with a high degree of certainty but without a commensurately high amount of processing.

A further object of this invention is to provide an improved system for detecting a document independent of the orientation of the document when it is being scanned or copied.

According to one aspect of this invention, a method is provided for detecting a pattern in an input image. The method comprises the following steps: generating from the input image digital data defined by a plurality of rows of pixels, each pixel defined by an N-bit value; processing at least some of the rows of pixels one row at a time by obtaining a row of pixels, thresholding the N-bit value of each pixel in that row to an M-bit value where M<N, and storing the M-bit pixel values row-by-row in a buffer; performing a specified element finding procedure on a select number of rows of thresholded digital data stored in the buffer to determine if at least a portion of the specified element is present in the stored digital data; and if it is determined that at least a portion of the specified element is present in the stored digital data, performing the following steps: calculating coordinates of a particular characteristic of each specified element, at least a portion of which is identified in the stored digital data, and storing the calculated coordinates in a list; generating a density template for each specific element for which coordinates have been calculated by partitioning an area of the stored digital data containing that specified element including an interior thereof into a plurality of sectors and maintaining a density count for each sector; and performing template matching for each specified element for which a density template has been generated to determine if that density template substantially matches a corresponding reference pattern density template.

According to another aspect of the invention, a method is provided for detecting a pattern in an input image. This method comprises the following steps: generating from the input image digital data defined by a plurality of rows and columns of pixels, each pixel defined by an N-bit value; subsampling the digital data by processing a predetermined number of rows and columns of pixels; thresholding the subsampled digital data; performing an edge detection procedure on the thresholded digital data to detect and store edge pixels; performing a specified element identification procedure on a region of digital data comprising a select number of rows of stored, edge-detected pixels by calculating a correlation between the region of digital data and a corresponding sector template to determine if at least a portion of the specified element is present in the region of digital data; and if the calculated correlation is greater than a predetermined trigger threshold, performing the following steps: performing an acceptance test on an area of digital data containing each specified element, at least a portion of which is identified in the region of digital data; generating a density template for each accepted specific element by partitioning the area of digital data containing that specified element including an interior thereof into a plurality of sectors and maintaining a density count for each sector; and performing template matching for each specified element for which a density template has been generated to determine if that density template substantially matches a corresponding reference pattern density template.

The methods may be embodied in a program of instructions which is stored on a medium readable by a processor-controlled device or implemented using hardware. As is described more fully below, one of the methods is more suitable for software implementation while the other method is more suitable for hardware implementation.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

FIG. 1 shows the general configuration of an imaging system 10 which may be part of a digital color copier, scanner/printer, etc. As shown in FIG. 1A, imaging system 10 has three major components, a scanner 12 for reading in a document, an image processor 14 for processing the scanned image and, in the present invention, for performing analysis and comparison functions to determine if the scanned document contains a certain type of pattern, and an output device such as a printer 16. The scanner 12 can take various forms such as a conventional light emitting scanner 12 found in copiers (FIG. 1B) or may take the form of a digital camera 20 directly connected to a printer 16 (FIG. 1E).

Figure 1A:
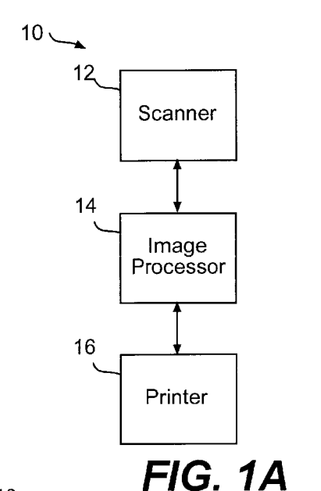
FIGS. 1A through 1E are block diagram representations of various general configurations illustrating the environment in which the present invention may be practiced.
Figure 1B:
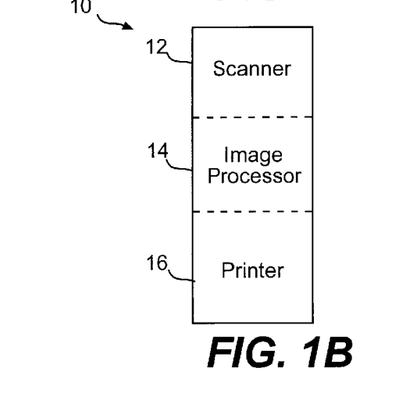

The image processor 14 may be implemented in hardware with discrete components and/or application specific integrated circuits (ASICs), software, firmware, digital signal processors, or any combination thereof. Also, the functional blocks of the image processor 14 and related components are divided in this application for convenience of description only. The functional and physical boundaries of these blocks will vary from device to device. For example, FIG. 1B shows the image processor 14 physically integrated with the scanner 12 and printer 16 in a single housing of a color copier. Portions of the image processor 14 may be associated functionally more with the scanner 12 than with the printer 16 or vice versa.

Figure 1C:
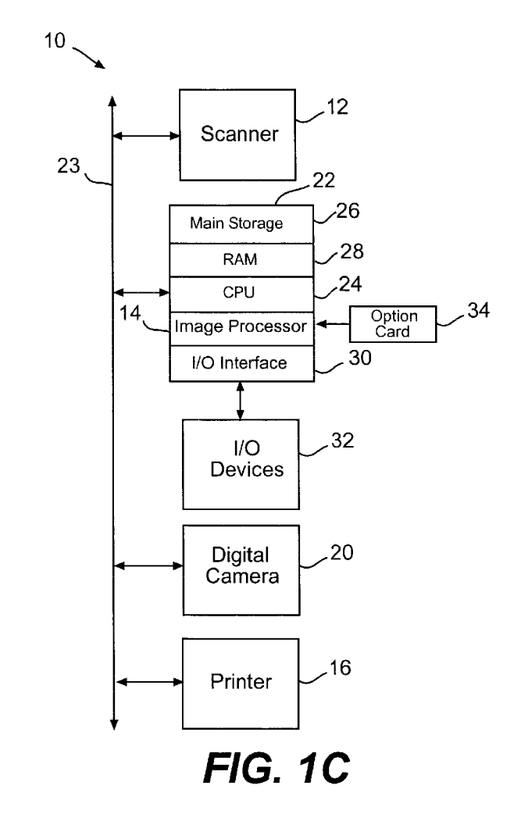

FIG. 1C shows an embodiment of a scanner/printer device with the image processor 14 formed as part of a computer 22 which may control operation of, and communication between, the scanner 12, printer 16 and image processor 14, as well as between peripheral equipment such as I/O devices 32, each connected directly or indirectly to a bus 23. The computer 22 includes a central processing unit (CPU) 24 which provides computing resources and controls the computer 22 by fetching, examining and executing instructions contained in programs that may be stored in main storage 26 such as a hard disk. The main storage 26 also stores data. The computer 22 further includes random access memory (RAM) 28 where the programs reside during execution. An I/O interface 30 connects the computer 22 to the I/O devices 32, via adapters/controllers (not shown), for creating, storing, transmitting and displaying data. The I/O devices 32 may include a keyboard, mouse, display, communications device such as a modem, and/or external storage device.

External storage device 32 may include a storage medium such as a disk, magnetic tape or optical medium that may be used to record programs of instructions for operating systems, utilities and applications, and may include embodiments of programs that implement various aspects of the present invention. These programs may then be copied into RAM 28 and executed by CPU 24.

Storage device 32 may also be used to load the "scanned image" (which was previously stored in storage device 32) into the computer 22 through I/O interface 30. Alternatively, the image may be captured with a digital image input device such as digital camera 20.

As previously noted, the image processor 14 and the functions it performs may be implemented in a wide variety of ways including discrete components, one or more ASICs and/or program-controlled processors. In the form of hardware, image processor 14 can be embodied in the computer 22 itself or on an option card 34 that can be inserted into an available computer card slot. In the form of software, image processor 14 may be loaded into computer 22 from external storage device 32 and executed by CPU 42. Such software may be conveyed by a variety machine readable medium including magnetic tape, magnetic disk, optical disc, and baseband or modulated communication paths throughout the spectrum including from supersonic to ultraviolet frequencies.

Figure 1D:
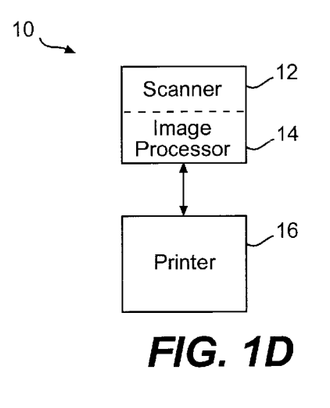
Figure 1E:
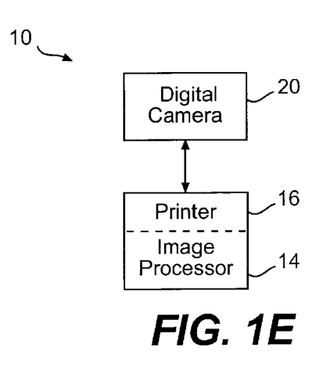

FIG. 1D shows an embodiment in which the image processor 14 is physically part of the scanner 12, while FIG. 1E shows the image processor 14 as a physical part of the printer 16. In FIG. 1E, the image is input with a digital camera 20 rather than a conventional scanner 12.

While the present invention is applicable to a variety of image processing devices, the preferred embodiment of the invention is an environment where the image processor 14 is embodied in a color copier or scanner/printer arrangement and where the image processor 14 includes a pattern recognition module (to be described) that detects one or more targeted patterns contained in a document.

Figure 2:
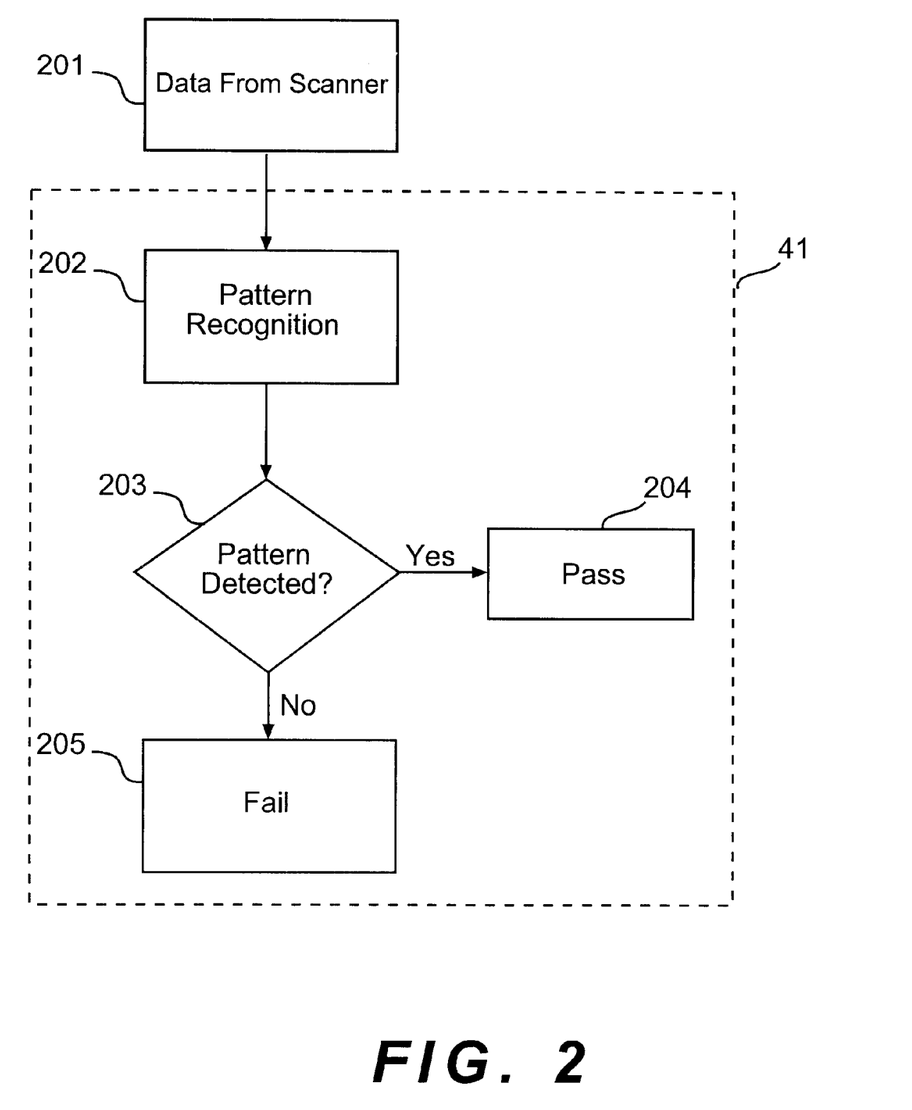
FIG. 2 is a flow diagram which illustrates the basic pattern recognition process executed by the pattern recognition module in accordance with the present invention.

The basic process of pattern recognition performed by the pattern recognition module 41 is depicted in FIG. 2 in connection with a system comprising image scanning/printing and/or image copying functions. Initially, in step 201, digital data representing a scanned document is sent from the scanner to the pattern recognition module 41 where the digital data is analyzed (step 202) to determine if the document contains one or more patterns which the pattern recognition module 41 is configured to detect (step 203). If the targeted pattern(s) is/are detected, the pattern recognition module 41 outputs a signal which indicates successful detection (step 204). If the targeted pattern(s) is/are not detected in step 203, module 41 transmits a signal indicating that detection was not successful (step 205).

The underlying pattern detection algorithms of the present invention for the pattern recognition module 41 are targeted at recognizing patterns on a document. These patterns conform to a certain pattern type that is described below.

1. Basic Pattern Type

Figure 3:
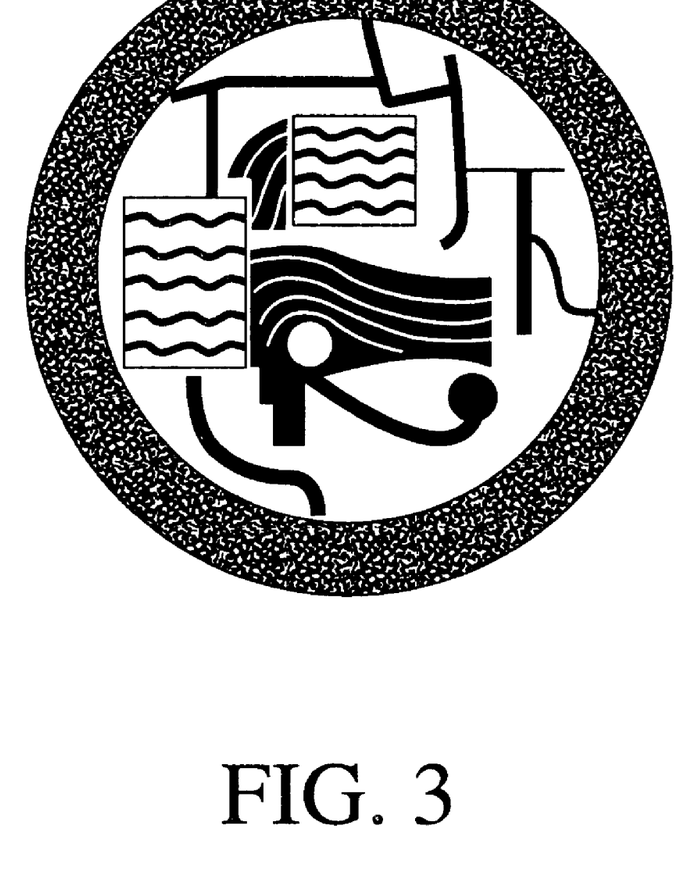
FIG. 3 illustrates the basic pattern type which can be detected in accordance with the present invention.

An example of the basic pattern type which the pattern recognition module 41 is adapted to recognize is shown in FIG. 3. This basic pattern type comprises a relatively large circular element having a boundary defined by two concentric circles and a middle region shown in black in the figure with some specific image content inside of the boundary. The image content may vary but preferably comprises a limited set of image patterns, which are known a priori. It should be noted that the boundary as well as the image content inside can occur in a plurality of colors such as red, black and yellow. Furthermore, the background of this basic pattern may include some texture and is not restricted to the plain background depicted in FIG. 3, since only the foreground is targeted for recognition.

The algorithms for detecting these foreground patterns may be embodied in color copiers or within a software version of a printer driver to indicate whether or not documents to be copied/printed contain such foreground patterns and, if desired, to prevent the unauthorized copying/printing of documents that contain such patterns.

2. Pattern Recognition Algorithms

The goal of the present invention is to detect patterns of the basic type shown in FIG. 3 from a bitmap image provided by any digital image acquisition device such as scanner 12. To do this, the inventors have developed algorithms directed at detecting such patterns which are preferably implemented in a copier system. If desired, the copier output may be disabled when at least one targeted pattern conforming to the basic pattern type is detected in the scanned output. Note that the bitmap image provided by the scanner 12 may contain a mix of one or more specific patterns of the basic pattern type. Furthermore, the background may vary from pattern to pattern.

In a preferred embodiment, the algorithms of the present invention are row-based, meaning that the output of the scanner 12 is processed in a row-by-row manner. Also, preferably only a limited number of rows are used for detecting each pattern.

Figure 4:
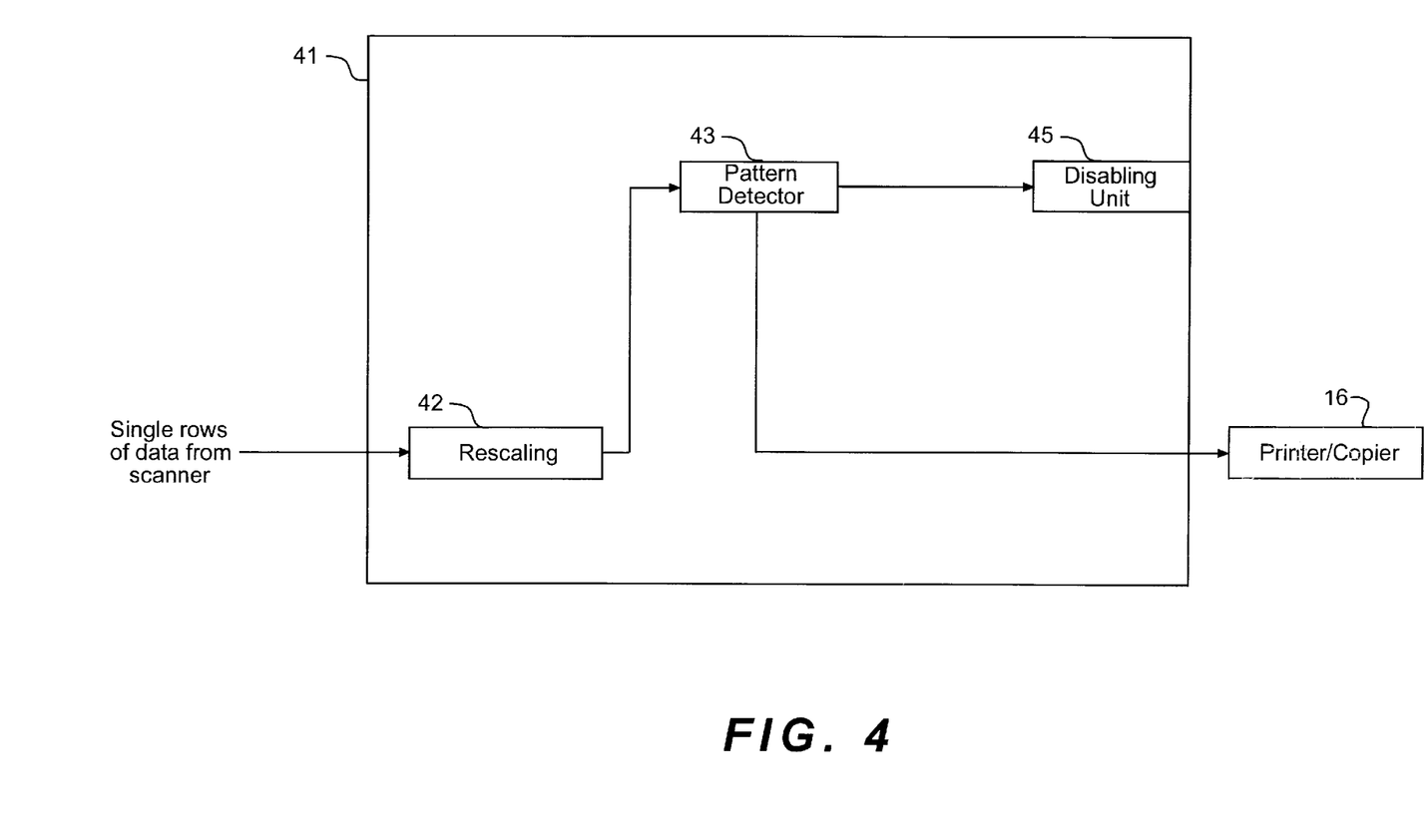
FIG. 4 is a block diagram of the pattern recognition module employing pattern detection in accordance with embodiments of the invention.

A block diagram of the pattern recognition module 41 employing pattern detection in accordance with the invention is depicted in FIG. 4. Digital data (usually 24 bit/pixel data) is received from the scanner 12 one row at a time. The data is rescaled in block 42, after which it is transmitted to pattern detector 43. The resealing function is used to adjust the dimensions of the bitmap being sent to the pattern recognition module 41. Rescaling is needed to compensate for the scaling that may have occurred during the scanning process.

Pattern detector 43 analyzes the rescaled data to determine if the data indicates the presence of specific targeted patterns on the scanned document and outputs a signal indicating either that at least one targeted pattern has been detected or that none of the targeted patterns has been detected. A disabling unit 45 may be employed to disable the printing/copying function to prevent the duplication of the scanned document if successful detection of a targeted pattern has occurred. If none of the targeted patterns is detected, the rescaled data is transmitted to be printed or copied.

2.1 Pattern Detection

In accordance with the invention, there are two different algorithms for pattern detection; one is more suitable for software implementation on a general purpose computer and the other is more suitable for implementation using hardware such as an ASIC.

2.1.1 Software Implementation

Figure 5:
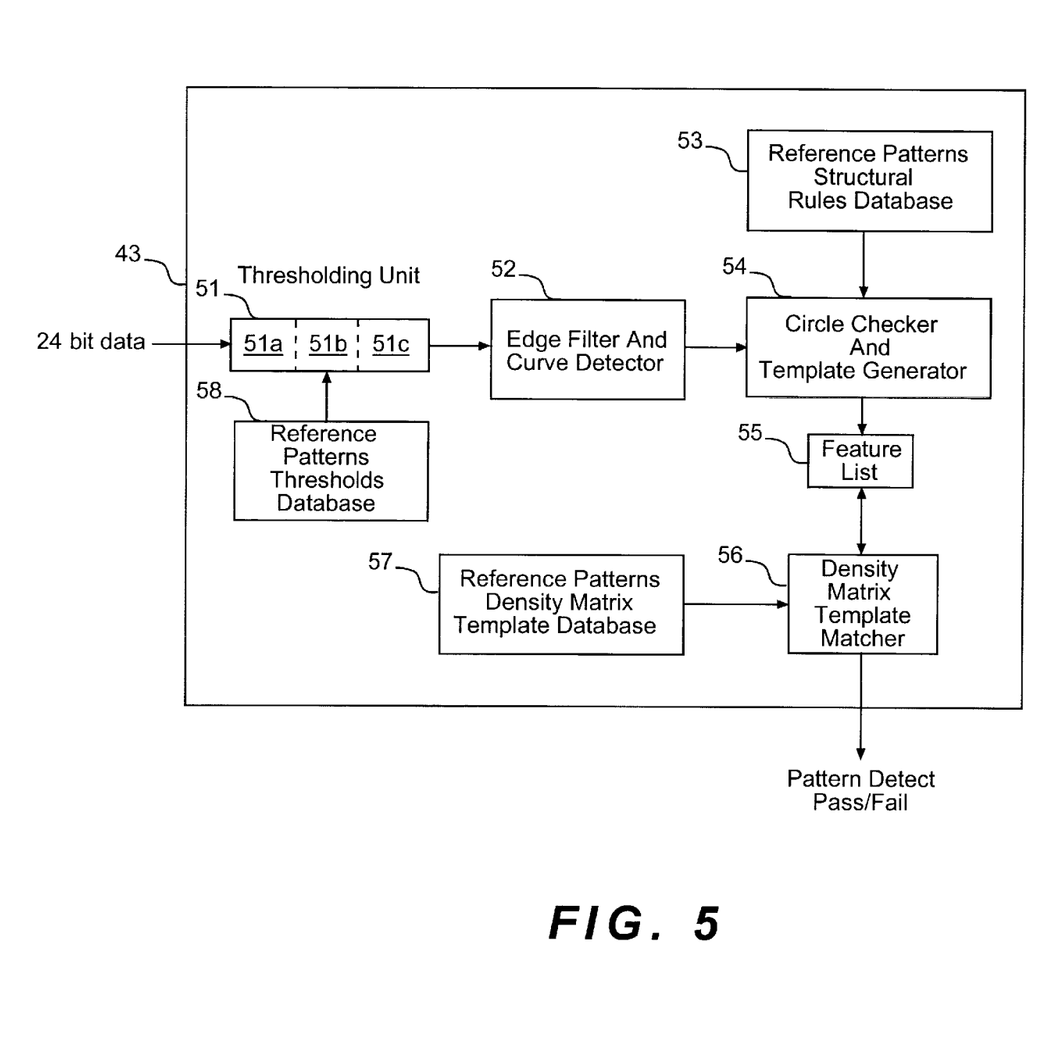
FIG. 5 is a block diagram showing the functional blocks of the pattern detector suitable for implementation on a general purpose computer in accordance with embodiments of the invention.
Figure 6:
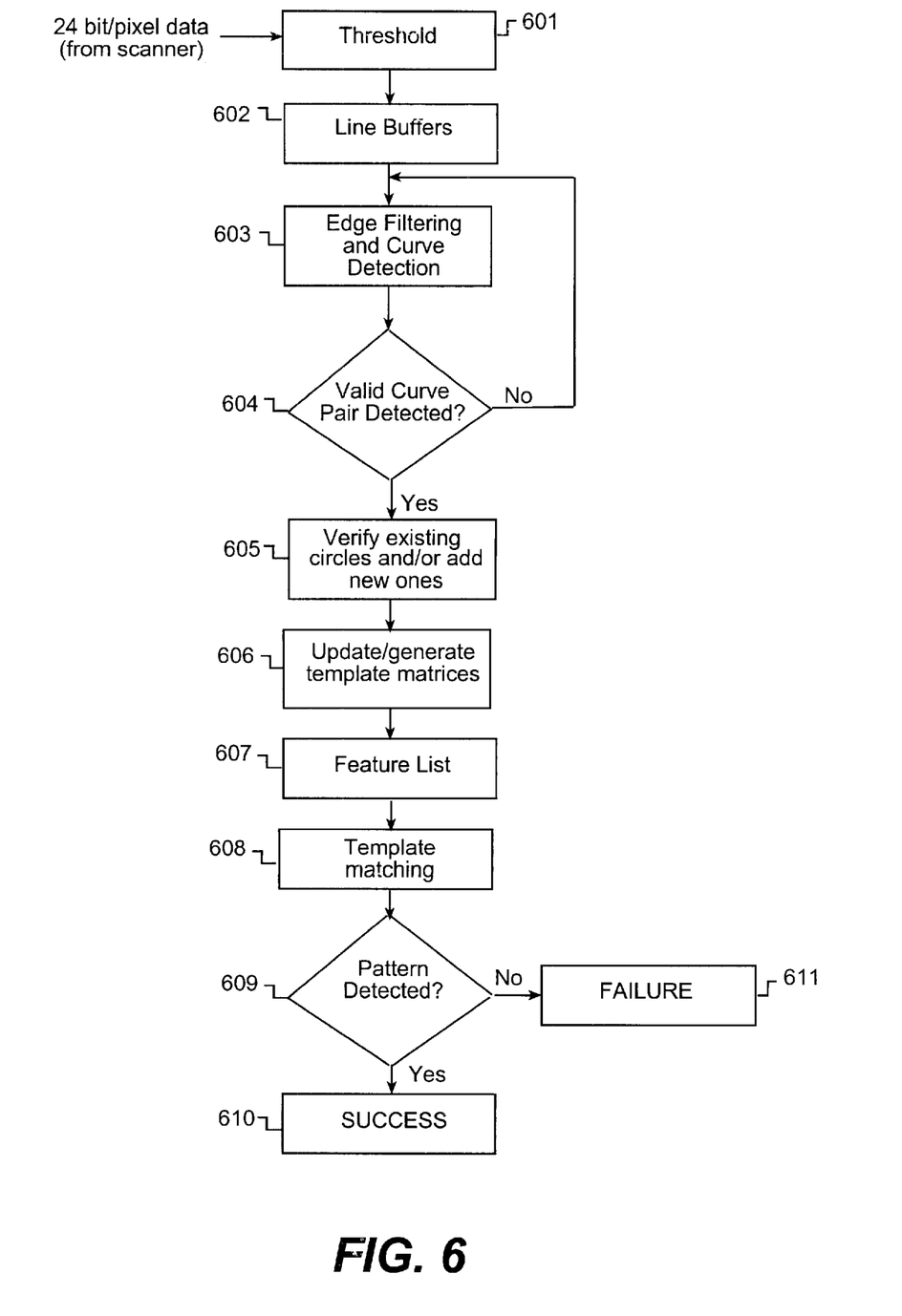
FIG. 6 is a flow chart of the pattern detection process of the present invention corresponding to the block diagram of FIG. 5.

FIG. 5 is a block diagram of the pattern detection functional blocks that can be used to implement such detection on a general purpose computer such as computer 22. The overall process flow for the pattern detection is shown in FIG. 6. The details of the pattern detector 43 and -the process it performs are described below with reference to these figures.

The 24 bit/pixel scanner output rows are first quantized (i.e., thresholded) in a thresholding unit 51 (step 601). Each pixel value is thresholded down to M bits/pixel where typically $8 \geq M \geq 1$. After each pixel in a given row is thresholded, that row data is stored in a line buffer in unit 51 (step 602). In the case where a plurality of distinct patterns are being targeted, each scanner output row is processed the same number of times as there are patterns being targeted. Moreover, each distinct pattern will have its own set of thresholds which is based on the profile of intensity variation of the pattern. For example, if three distinct patterns are being targeted (x, y and z), each scanner output row is processed three times—once for thresholding the 24-bit data using the thresholds for the x pattern and storing the thresholded row in internal buffer 51a; then, the 24-bit pixels of the image row are accessed again and thresholded using thresholds for the y pattern, after which the thresholded data is saved in another buffer 51b; and the third time, the row is thresholded using the thresholds for the z pattern and the resulting thresholded data stored in a third buffer 51c. Thus, the thresholding and storing process generates n sets of thresholded data, each set stored in a separate buffer, where n is the number of distinct patterns being targeted. The thresholds for each of the patterns to be detected are stored in the reference patterns thresholds database 58.

After a predetermined number of rows of data are thresholded and stored (usually around 8–12 rows), an edge-based circle finding procedure is applied to the thresholded data using an edge filter and curve detector 52 to determine if portions of a circle from the scanned data can be detected (step 603). Using circle geometry information, such as center coordinates and radius data, stored in a reference patterns structural rules database 53, a circle checker and template generator 54 analyzes pairs of curves to determine if a given pair appears to belong to the same pattern boundary and conforms to the known dimensions of the boundary of a particular pattern being targeted (step 604). If so, circle checker and template generator 54 calculates the coordinates of the circle center and determines if this information corresponds to an existing circle or a new circle (step 605). This information is then saved in a feature list 55. If the decision in step 604 is "no" the process returns to step 603 where edge filtering and curve detection is done on the next set number of rows of data. Note that if the presence of, say, R reference patterns are targeted for detection in the scanned output, structural rules database 53 will contain R sets of circle geometry information. Furthermore, if the circle checker 54 needs to be scale invariant, then the structural rules database 53 will contain circle geometry information for each of the scales at which the circles need to be detected. For example, if three patterns, x, y and z, are targeted for detection then structural rules database 53 will have three sets of data. Furthermore, if, say, these patterns have to be detected when scanned output is at 100% scale, 75% scale, 50% scale, 125% scale, and 150% scale, then an additional four sets of data for each of the patterns is needed, i.e., the total number of datasets in structural rules database 53 would be fifteen.

Figure 7:
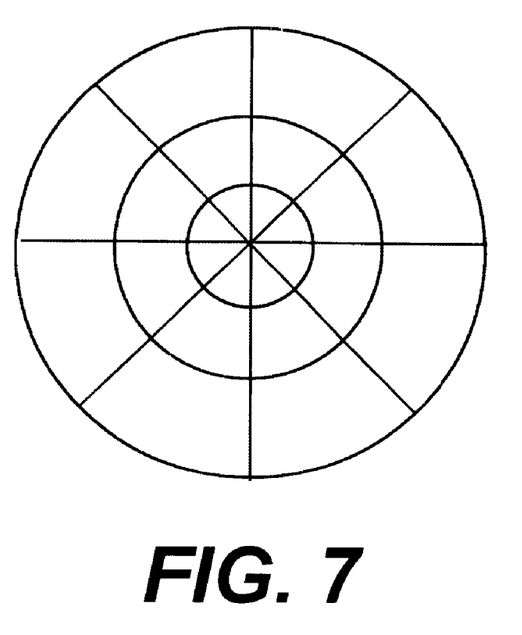
FIG. 7 illustrates a circular element partitioned into sectors in accordance with the pattern detection process depicted in FIG. 6.

If a portion of the circle has been detected in step 605, additional rows of thresholded data are obtained, as necessary, to obtain an area of thresholded data large enough to contain the full circular element including the boundary and the specific image pattern contained inside the boundary. The circle checker and template generator 54 then partitions the full circular element into sectors and maintains a density count for each sector. The density count in a particular sector is the number of 1's in that sector divided by the area of that sector. If all the areas are the same size, the density count is simply the number of 1's in each sector. An example illustrating the partitioning of a full circular element into sectors is depicted in FIG. 7. In a preferred embodiment, each detected circular element is partitioned into 300 sectors which are organized as a 30×10 matrix. In the case where multiple circular elements are detected in the data, the corresponding containing areas of data may be completely distinct, overlapping or coextensive depending on the locations of the circular elements relative to one another. However, each distinct circular element is partitioned separately. After the entire scanned image has been processed, a 30×10 density matrix representing each of the circular elements in the scanned image is generated by template generator (step 606) and stored in the feature list 55 (step 607). These density matrices are now pattern candidates.

Having formed at least one pattern candidate, a density matrix template matcher 56 then performs template matching by comparing each density matrix computed in template generator 54 with a corresponding reference matrix stored in a reference patterns density matrix template database 57 (step 608). In one embodiment, one 30×10 reference matrix template is used for each pattern being targeted. Thus, for the case where there are three patterns being targeted (x, y and z), there would be three 30×10 reference pattern matrices—one for the x pattern, a second for the y pattern and a third for the z pattern. However, in order for the pattern detection to be rotation invariant, the matrix matching should be performed for various orientations of each reference pattern. Thus, in a preferred embodiment, instead of storing a single 30×10 matrix for each reference pattern, twelve matrices are stored to capture rotation by one degree increments. In step 608, elements of each 30×10 circle matrix are compared to the elements of one or more of these 30×10 reference matrices stored in template database 57. If the template matcher 56 determines in step 609 that one of the circle matrices matches a reference matrix, then the pattern corresponding to that reference matrix has been successfully detected (step 610). If there is no match in step 609, then the targeted pattern has not been detected (step 611).

The details of the template matching and pattern detection decision carried out in steps 608 and 609 are set forth below. Let the 30×10 density matrix output by template generator 54 be the elements S[I][J], I=1,2, . . . ,10, J=1,2, . . . ,30. To determine if this density matrix matches, say, the corresponding reference matrix for pattern x whose density matrix elements in template database 57 are xref[I][J], I=1,2, . . . 10 , J=1,2, . . . ,30, then template matching involves these steps:

a) Initialize xmatch_count=0
 b) for I=1,2, . . . ,10 and J=1,2, . . . ,30 if the difference between S [I][J] and xref[I][J] is less than a threshold T increment xmatch_count by 1.
 c) If xmatch_count is greater than a threshold MATCH, template matcher 56 declares a match against reference pattern x and the pattern detector 43 output is a pass. Note that steps a) through c) are to be repeated for each of the reference patterns for which the pattern detector 43 is designed. The thresholds T and MATCH are specific to each reference pattern and are contained in template database 57.

In one embodiment, the pattern detector 43 for software implementation needs only 8 rows and at most 100 pixels per row at 8 bits/pixel for initial circle detection. However, to generate the 30×10 density matrices, typically more data is needed, depending on the size of the identified circular element. The template database 57 contains the 30×10 reference template matrices for each reference pattern that is to be detected from the scanner output. Scratch pad memory is also needed.

2.1.2 ASIC Implementation

Figure 8:
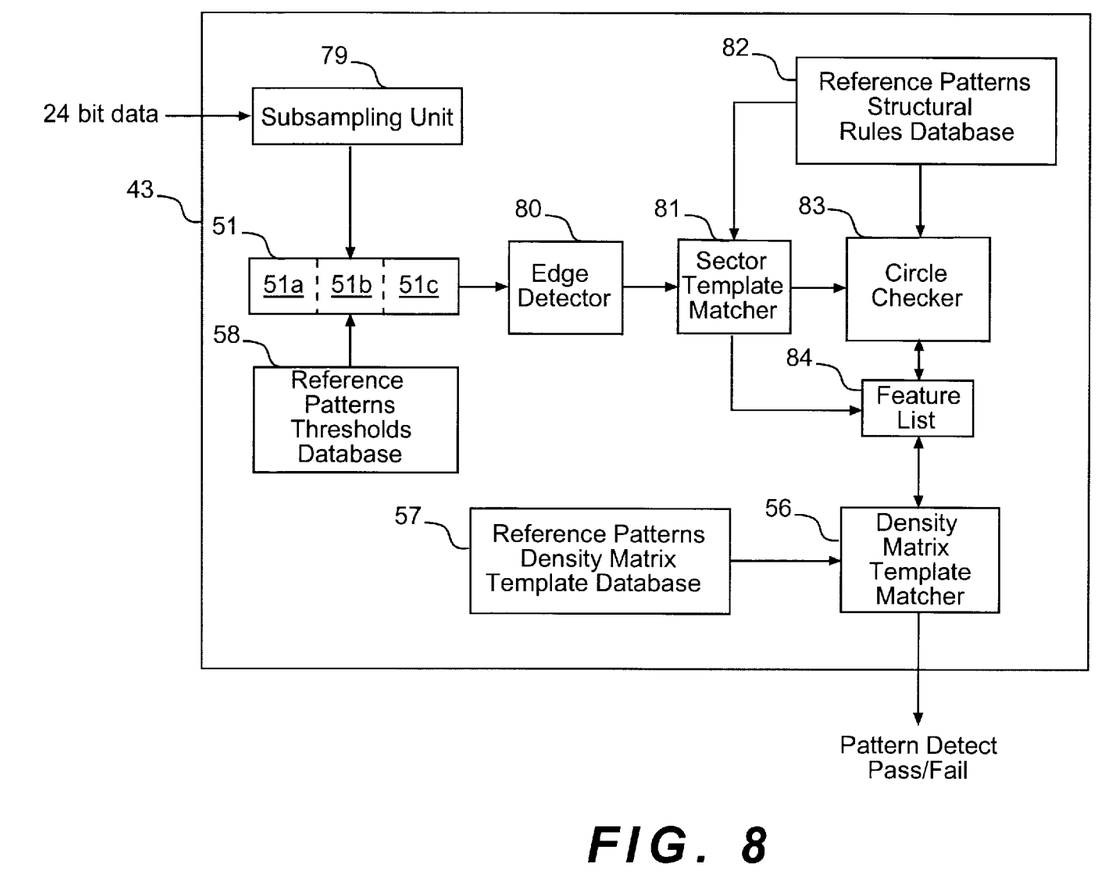
FIG. 8 is a block diagram showing pattern detection components suitable for implementation on an ASIC in accordance with embodiments of the invention.

FIG. 8 is a block diagram of the pattern detection components that can be used to implement such detection on an ASIC. The basic structure is similar to that of FIG. 5; however, instead of using the edge filter and curve detector 52 and circle checker and template generator 54, this embodiment employs an edge detector 80, sector template matcher 81 and circle checker 83 to perform a different matching technique in detecting the circles. The density matrix template matching procedure is the same as the one described in step 608 of FIG. 6 in the software implementation embodiment. Thus, the details of this matching technique used by the pattern detector 43 to detect the circles in this implementation are described below with reference to FIGS. 6, 8 and 10.

Figure 10:
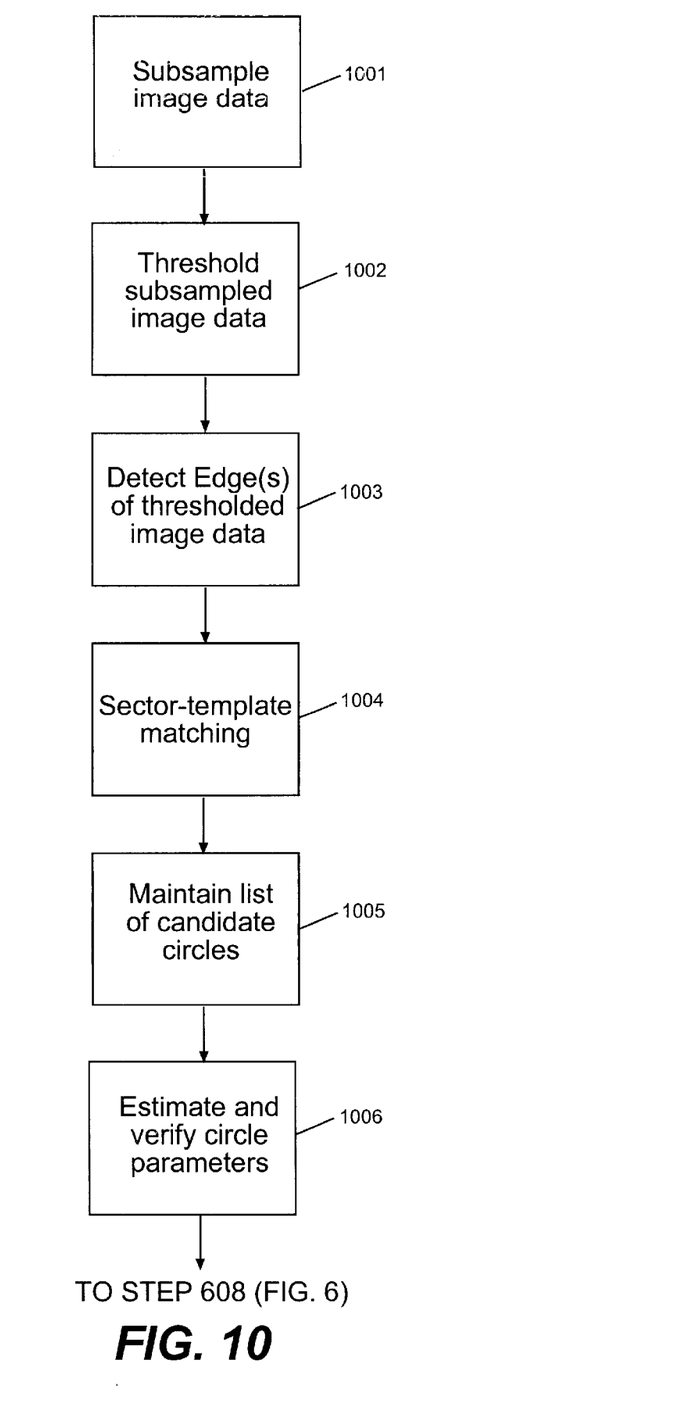
FIG. 10 is a flow chart of the pattern detection process of the present invention corresponding to the block diagram of FIG. 8.

The sequence of steps involved in circle detection are as follows:

(a) subsampling image data performed in subsampling unit 79 (step 1001);

(b) thresholding the subsampled image data in thresholding unit 51 down to M bits/pixel where typically 8≧M≧1 and storing the thresholded data in buffers 51*a*, 51*b* and 51*c* (step 1002);

(c) performing edge detection of thresholded image in edge detector 80 (step 1003);

(d) performing candidate circle identification by sector-template matching in sector template matcher 81 (step 1004);

(e) maintaining a list of candidate circles in feature list 84 (step 1005); and (f) circle parameter estimation and verification in circle checker 83 (step 1006).

(a) Subsampling Image Data

The 24-bit input image data is subsampled by an integral factor in subsampling unit 79. If the subsampling factor is Q, for example, the size of the input image is reduced by taking only the pixels belonging to every $Q^{th}$ row and $Q^{th}$ column of the input image to form the subsampled image. The subsampling factor depends on the thickness of the circle boundary. Thick circle boundaries can be detected reliably with higher subsampling factors. For the illustrative pattern type, the thickness of the circle boundary is three or four pixels, and the subsampling factor is two or three.

(b) Thresholding of Image Data

The subsampled image data is thresholded down to at least 8 bits/pixel and preferably down to 1 bit/pixel in thresholding unit 51 by comparing each pixel's color to the color of the circle to be detected. The color coordinates of the pattern may be specified as a red, green and blue triplet or in a device-independent color space. In the preferred embodiment, the binary value of each pixel in the subsampling is assigned as 1 if the distance in the color space between the color of the pixel and the color of the pattern is less than a specified threshold, otherwise it is assigned as 0. The distance metrics used are based on the L1 and L2 norms. Other metrics may also be used.

(c) Edge Detection

In the preferred embodiment, edge detection is performed by the edge detector unit 80 on the binary image data generated by the thresholding unit 51. A pixel is denoted as an edge pixel if its value is 1 and there exists a pixel in the neighborhood of this pixel with a value of 0. The structure of the neighborhood chosen may be 4-connected or 8-connected.

(d) Candidate Circle Identification by Sector-template Matching

Figure 9:
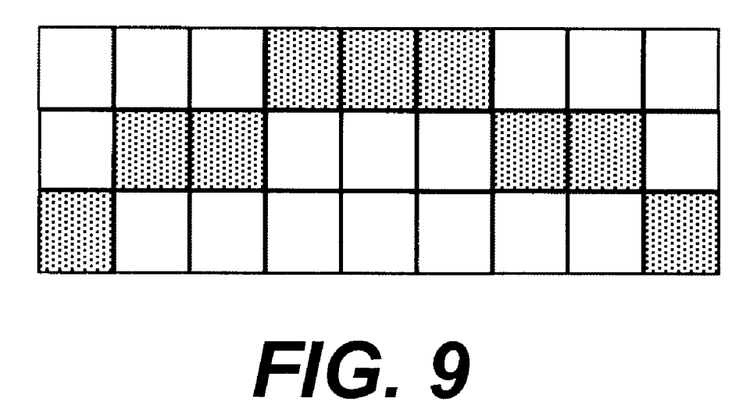
FIG. 9 illustrates the template used for the sector template matcher of FIG. 8.

Once a given number of edge-detected rows of the subsampled image have been acquired (typically 8–12 rows), the sector template matcher or template correlator 81 attempts to locate shapes in the image data that correspond to the start of a circle as shown in the sector template depicted in FIG. 9. The size and shape of the sector template depends on the number of acquired rows over which the search is performed and the radius of the circle to be detected. The thickness of the circle in the sector template shown in FIG. 9 is determined by the level of noise in the edge map of the subsampled image, which depends on scanner characteristics and the quality of pattern rendering on the input medium.

If the correlation between the sector template and an image region is greater than a specified trigger threshold, a new candidate circle corresponding to this region is added to the list of possible circle candidates. The trigger threshold is stored in structural rules database 82. There will be at least one trigger threshold for each reference pattern. Since the sector template determines the approximate radius and location of each candidate circle, the parts of the edge-map image that contain each candidate circle can then be obtained based on that information. If a candidate circle is spawned at a particular location, new candidates may not be spawned in a small neighborhood of that location to prevent spawning multiple candidates that correspond to the same instance of a specific pattern.

(e) Maintaining a List of Candidate Circles

As each candidate circle in the candidate-circle list finishes acquiring edge-data corresponding to an area or bounding box containing the candidate circle, a hypothesis test is performed by circle checker 83 to determine if the edge-map in the bounding box indeed corresponds to a circle. First, a search is conducted around the approximate radius and location of the candidate circle to determine a best-fit circle to the edge-map. If the correlation between the best-fit circle and the edge-map data exceeds an acceptance threshold, the candidate circle is marked as a detected circle. If the correlation is less that the acceptance threshold, the candidate circle is deleted from the list of circle candidates. The acceptance threshold is available in the structural rules database 82; there will be one acceptance threshold for each reference pattern.

In the event that the list of circles begins to exceed a preset number, an elimination step is executed to remove bad candidates from the list of circle candidates, thereby conserving memory. The elimination step proceeds as follows. Assume that a given candidate circle has acquired x% of the edge-map in its bounding box so far. In order to meet the acceptance threshold (say, a%), the best-fit partial-circle correlation to this data should have a minimum correlation of $((a+x-100)/x)\%$. If a candidate circle fails to meet this minimum correlation criterion, it is eliminated from the list of candidate circles. The candidate circles are maintained in feature list 84.

(f) Circle Parameter Estimation and Verification

The sector template defines an approximate radius and location for each candidate circle. The true circle parameters are estimated by stepping through a small range of two-dimensional circle locations and one-dimensional circle radii in a neighborhood of the approximate initial estimates. The correlation of each circle with the edge map is computed and the circle with the best correlation is returned as the best fit circle by the circle checker 83. If the correlation of the best-fit circle is greater than the acceptance threshold it is marked as a detected circle and this data is recorded in the feature list 84 along with the location of the circle. The binarized values for the pixels inside this detected circle are also recorded in the feature list for use in the template matcher 56.

The template matching procedure is same as that described in connection with FIGS. 5 and 6.

As the foregoing description demonstrates, the pattern detection techniques of the present invention are particularly well suited to be implemented in a color copier or scanner/printer arrangement using hardware or software, and may also be implemented using a combination of hardware and software. With that in mind, it is to be understood that the block and flow diagrams used to illustrate the techniques of the present invention show the performance of certain specified functions and relationships thereof. The boundaries of these functional blocks have been arbitrarily defined herein for the convenience of description. Alternate boundaries may be defined so long as the specified functions and relationships thereof are appropriately formed. The diagrams and accompanying description provide the functional information one skilled in the art would require to implement a system to perform the processing required. Each of the functions depicted in the block diagrams may be implemented, for example, by software, functionally equivalent circuits such as discrete components, application specific integrated circuits (ASICs), or combination thereof.

While the invention has been described in conjunction with several specific embodiments, many further alternatives, modifications and variations will be evident to those skilled in the art in light of the foregoing description. For example, the pattern recognition techniques described herein may be applied in money recognition methods and devices for detecting certain patterns present on currency, securities, negotiable instruments, etc. and for disabling the device from copying or printing a document on which a targeted pattern is detected. Thus, the invention described herein is intended to embrace all such alternatives, modifications, applications and variations as may fall within the spirit and scope of the appended claims.

What is claimed is:

1. A method for detecting a pattern in an input image, comprising:

generating from the input image digital data defined by a plurality of rows of pixels, each pixel defined by an N-bit value;

processing 12 or fewer rows of pixels one row at a time, each row containing at most 100 pixels, by obtaining a row of pixels, thresholding the N-bit value of each pixel in that row to an M-bit value where M<N, and storing the M-bit pixel values row-by-row in a buffer, wherein M is based on the pattern to be detected;

performing a specified element finding procedure on the processed rows of thresholded digital data stored in the buffer to determine if at least a portion of the specified element is present in the stored digital data, wherein the specified element is a geometric shape that forms a part of the pattern; and if it is determined that at least a portion of the specified element is present in the stored digital data, performing the following steps:

calculating coordinates of a particular characteristic of each specified element, at least a portion of which is identified in the stored digital data, and storing the calculated coordinates in a list;

generating a density template for each specified element for which coordinates have been calculated by partitioning an area of the stored digital data containing that specified element including an interior thereof into a plurality of sectors and maintaining a density count for each sector; and performing template matching for each specified element for which a density template has been generated to determine if that density template substantially matches a corresponding reference pattern density template.

2. The method of claim 1, wherein N is 24 and M is greater than or equal to 1 and less than or equal to 8.

3. The method of claim 1, wherein the specified element is a circle and the specified element finding procedure is an edge-based circle finding procedure that is performed on the predetermined number of rows of thresholded digital data stored in the buffer to determine if at least a portion of a circle is present in the stored digital data.

4. The method of claim 3, wherein, if it is determined in the specified element finding procedure performing step that at least a portion of a circle is present in the stored digital data, the following additional step is performed:

determining, based on the calculated coordinates of the particular characteristic of the circle, at least a portion of which is determined to be present in the stored digital data, whether that circle corresponds to an existing circle or a new circle.

5. The method of claim 1, wherein, in the density template generating step, each density template generated is a density matrix and each corresponding reference pattern density template is a reference pattern density matrix.

6. The method of claim 5, wherein the template matching performing step comprises comparing each density matrix generated with the corresponding reference pattern density matrix.

7. A method for detecting a pattern in an input image, comprising:

generating from the input image digital data defined by a plurality of rows and columns of pixels, each pixel defined by an N-bit value;

subsampling the digital data by only processing pixels in every Q row and pixels in every Q column, where $Q \geq 2$;

thresholding the subsampled digital data;

performing an edge detection procedure on the thresholded digital data to detect and store edge pixels;

performing a specified element identification procedure on a region of digital data comprising a select number of rows of stored, edge-detected pixels by calculating a correlation between the region of digital data and a corresponding sector template to determine if at least a portion of the specified element is present in the region of digital data, wherein the specified element is a geometric shape that forms a part of the pattern; and if the calculated correlation is greater than a predetermined trigger threshold, performing the following steps:

performing an acceptance test on an area of digital data containing each specified element, at least a portion of which is identified in the region of digital data;

generating a density template for each accepted specified element by partitioning the area of digital data containing that specified element including an interior thereof into a plurality of sectors and maintaining a density count for each sector; and performing template matching for each specified element for which a density template has been generated to determine if that density template substantially matches a corresponding reference pattern density template.

8. The method of claim 7, wherein the thresholding step comprises thresholding the N-bit value of each pixel of the subsampled digital data to an M-bit value where M<N.

9. The method of claim 8, wherein N is 24 and M is greater than or equal to 1 and less than or equal to 8.

10. The method of claim 9, wherein M is based on the pattern to be detected.

11. The method of claim 7, wherein, in the density template generating step, each density template generated is a density matrix and each corresponding reference pattern density template is a reference pattern density matrix.

12. The method of claim 11, wherein the template matching performing step comprises comparing each density matrix generated with the corresponding reference pattern density matrix.

13. An apparatus for detecting at least one pattern in an input image represented by digital data defined by a plurality of N-bit value pixels, comprising:

a thresholding unit that processes 12 or fewer rows of pixels, one row at a time, each row containing at most 100 pixels, by obtaining a row of pixels, thresholding the N-bit value of each pixel in that row to an M-bit value pixel where M<N, and storing the thresholded M-bit value pixels row by row in a buffer, wherein M is based on the pattern to be detected;

a first database in communication with the thresholding unit, the database storing threshold values for at least one reference pattern;

means for determining if at least a portion of a specified element is present in the stored digital data, wherein the specified element is a geometric shape that forms a part of the pattern;

means for determining a characteristic of the specified element, if it is determined that at least a portion of the specified element is present in the stored digital data and storing the determined characteristic;

a template matcher that generates a density template for each specified element for which the characteristic was determined and compares that density template with a corresponding reference pattern density template to determine if that density template substantially matches the corresponding reference pattern density template;

wherein the template matcher partitions an area of the stored digital data containing the specified element including an interior thereof into a plurality of sectors and maintaining a density count for each sector.

14. The apparatus of claim 13, further comprising a second database that stores each corresponding reference pattern template.

15. A medium readable by a device embodying a program of instructions for execution by said device to perform a method for detecting a pattern in an input image, the method comprising:

generating from the input image digital data defined by a plurality of rows of pixels, each pixel defined by an N-bit value;

processing 12 or fewer rows of pixels one row at a time, each row containing at most 100 pixels, by obtaining a row of pixels, thresholding the N-bit value of each pixel in that row to an M-bit value where M<N, and storing the M-bit pixel values row-by-row in a buffer, wherein M is based on the pattern to be detected;

performing a specified element finding procedure on a select number of rows of thresholded digital data stored in the buffer to determine if at least a portion of the specified element is present in the stored digital data, wherein the specified element is a geometric shape that forms a part of the pattern; and if it is determined that at least a portion of the specified element is present in the stored digital data, performing the following steps:

calculating coordinates of a particular characteristic of each specified element, at least a portion of which is identified in the stored digital data, and storing the calculated coordinates in a list;

generating a density template for each specified element for which coordinates have been calculated by partitioning an area of the stored digital data containing that specified element including an interior thereof into a plurality of sectors and maintaining a density count for each sector; and performing template matching for each specified element for which a density template has been generated to determine if that density template substantially matches a corresponding reference pattern density template.

* * * * *